United States Patent Office
3,491,083
Patented Jan. 20, 1970

3,491,083
AZO DYESTUFFS FOR POLYAMIDE FIBERS CONTAINING A THIOPHENEDIOXIDE GROUP
Angelo Mangini and Antonio Tundo, Bologna, Italy, assignors to Aziende Colori Nazionali Affini ACNA S.p.A., Milan, Italy
No Drawing. Filed Jan. 10, 1967, Ser. No. 608,258
Claims priority, application Italy, Jan. 14, 1966, 864/66
Int. Cl. C09b 62/40, 62/38, 62/36
U.S. Cl. 260—162                                     8 Claims

---

ABSTRACT OF THE DISCLOSURE

Dye for polyamide fibers with the reactive radical

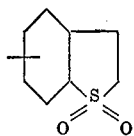
(I)

and more particularly

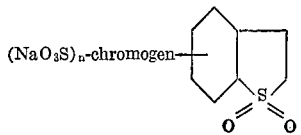
(II)

and

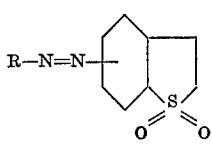
(III)

Compounds of (III) prepared by

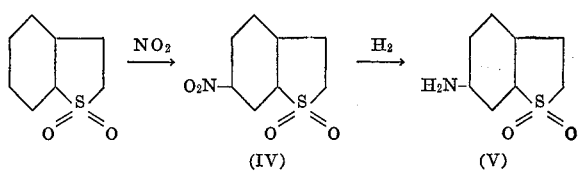

diazotizing (V) and coupling to form (III). The dye shows a good fastness for washing.

---

Our invention refers to a new class of water-soluble dyestuffs having a thiopheneoxide nucleus. The dyestuffs of this invention contain the radical

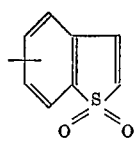
(I)

and dye natural (wool, silk, etc.) and synthetic (fibers from polyhexamethylene adipamide or from polymers of caprolactam, etc.) polyamide fibers with colors having excellent fastness to washing.

The dyes, obtained with dyestuffs containing the radical (I), resist the action of strong organic solvents, such as dimethylformamide and pyridine, even at boiling temperature. Thus, it can be assumed that covalent bonds are established between the aforesaid radical and the —NH$_2$ and —NH— groups of the polyamide fibers.

An object of the present invention are dyestuffs, able to react with the polyamide fibers, of the formula:

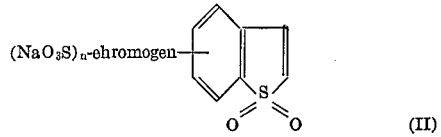
(II)

wherein $n$ is a number comprised between 1 and 4, and "chromogen" represents the residue of an organic dyestuff, preferably of azo, metallized azo, anthraquinone or phthalocyanine type.

Particularly good dyeing characteristics are in dyestuffs of the formula

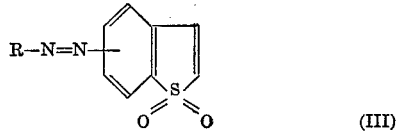
(III)

wherein R=radical of sulphonated pyrazolone derivatives, sulphonated naphthyl amines, sulphonated naphthols, sulphonated aminonaphthols and other components of analogous coupling compounds which may be optionally substituted.

The dyestuffs of the general Formula III are preferably prepared, and this is a further object of our invention, by nitration of benzothiophenedioxide and subsequent reduction of the nitro-derivative to amine:

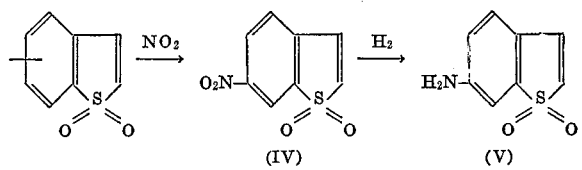

By diazotizing the amine (V) and coupling with the selected coupling agent R, the dyestuffs of the general Formula III are obtained.

The dyestuffs of our invention are applied to polyamide fibers by an acid bath containing an electrolyte, such as sodium sulphate, and occasionally other dyeing auxiliaries, of ionic, such as Diapon T (R), or non-ionic character.

The examples which follow are to illustrate, but not to limit, the present invention. (The parts and percentages, unless otherwise indicated, are understood as parts by weight.)

EXAMPLE 1

(a) Preparation of the amine (V)

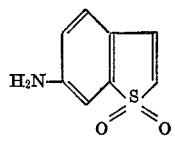
(V)

59 g. of stannous chloride are dissolved in 59 ml. of concentrated hydrochloric acid. To this solution, heated to 60° C., are added, under stirring and in small portions, 11.7 g. of 6-nitro-benzothiophenedioxide (prepared for instance as described in J. Chem. Soc. 1948, 1615–18). When the addition is finished, the mixture is heated for two additional hours at 50° C., then it is cooled and the stannous ion removed with NaOH having a 30% concentration. The amine (V) is collected by filtration and crystallized from chlorobenzol; M.P. 157–160° C.

(b) The amine (V) is employed to prepare the following dyestuff:

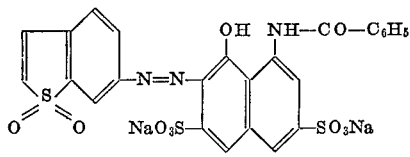

0.1 mol of the amine (V), obtained as described at (a), is directly diazotized and the diazonium salt is coupled, at 4–6° C., with benzoyl-H acid having a pH of 8. When the addition of the diazonium salt is finished, the reaction mass is stirred for 3–4 hours, the pH is brought to 7.2 and it is salified with KCl. The precipitate obtained is collected by filtration and dried at 40° C. A dyestuff is obtained, which dyes wool and nylon a red shade very fast to washing, according to the following method:

The fiber is immersed into a neutral aqueous solution (bath) of 50° C. containing

| | |
|---|---|
| Dyestuff _____ percent__ | 4 |
| Fiber: bath ratio _____ | 1:30 |
| CH₃COOH 1:2 _____ percent__ | 3 |

The bath temperature is then brought to boiling in 15 minutes. After another 15 minutes, 1:2 diluted acetic acid is added. Dyeing is at boiling temperature for 1 hour. The fiber is then extracted, washed at boiling temperature with water and subsequently with a solution of neutral soap having a concentration of 0.5% (parts per thousand).

EXAMPLE 2

By operating as described in the preceding example at point (b), but using the diazonium salt of the amine (V) 1-(4'-sulpho-phenyl)-3-methyl-5-pyrazolone as the coupling agent, a dyestuff is obtained having the following construction:

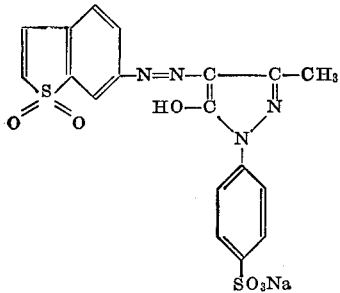

which dyes wool, by the method of Example 1, a yellow shade very fast to washing.

EXAMPLE 3

By operating as described in Example 2, at point (b), but coupling the diazonium salt of the amine (V) with benzoyl-K acid, the following dyestuff is obtained:

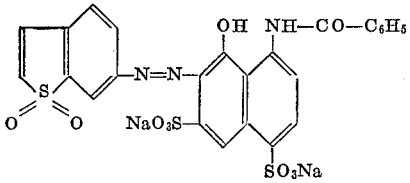

which dyes wool, by the method of Example 1, a bluish red shade very fast to washing.

EXAMPLE 4

By operating as described in Example 1 at point (b), but using as the coupling agent 1-(2'-5'-dichloro-4'-sulpho-phenyl)-3-methyl-5-pyrazolone, the following dyestuff is obtained:

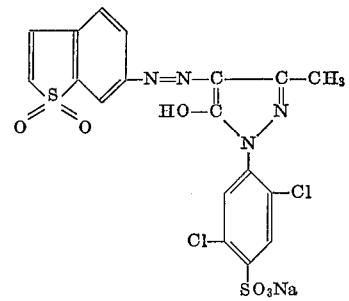

which dyes wool and nylon, by the method of Example 1, a yellow shade fast to washing.

EXAMPLE 5

The dyestuff of the structure:

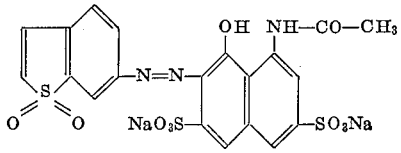

is obtained analogously to the preceding examples, using however acetyl-H acid as the coupling agent. It dyes wool, by the method of Example 1, an orange brown shade, fast to washing.

EXAMPLE 6

By operating as described at point (b) of Example 1, but employing acetyl isogamma acid as the coupling agent, the following dyestuff is obtained:

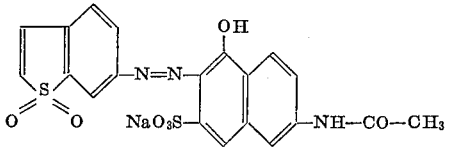

which dyes wool, by means of the method indicated in Example 1, a brownish orange shade, fast to washing.

EXAMPLE 7

By operating as described at point (b) of Example 1, but using N-phenyl-isgamma acid as the coupling agent for the diazonium salt of the amine (V), the following dyestuff is obtained:

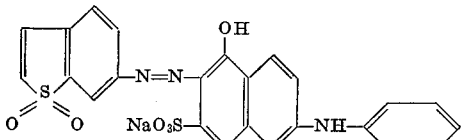

which dyes wool, by the method of Example 1, a red shade very fast to washing and to other wet treatments.

EXAMPLE 8

A solution consisting of

| | Parts |
|---|---|
| Dyestuff prepared according to Example 4 _____ | 1 |
| Crystals of sodium sulphate (Glauber) _____ | 10 |
| Acetic acid having a concentration of 50% _____ | 3 |
| Purified water _____ | 2500 | is prepared at a temperature of 40° C. 100 parts of previously degreased and purified woolen yarn are introduced and heating is started, so that the system reaches the boiling temperature in 10 minutes, while continuously stirring the goods to be dyed. After 20 minutes from the beginning of boiling, 2 additional parts of acetic acid having a concentration of 50% are added in order to favor the exhaustion of the dyestuff, and dyeing is continued, always stirring the material, for half an hour. Thereafter, the material is extracted, thoroughly rinsed and dried at a temperature not exceeding 60° C. The woolen yarn obtained is dyed in a brilliant yellow shade very fast to washing.

We claim:
1. Dyestuffs, reactive with polyamide fibers, of the formula

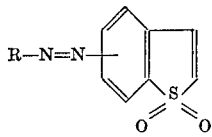

wherein R is a residue of a sulphonated pyrazolone derivative, sulphonated naphthyl amine, sulphonated naphthol, and sulphonated aminonaphthol.

2. Dyestuff according to claim 1, having the structure:

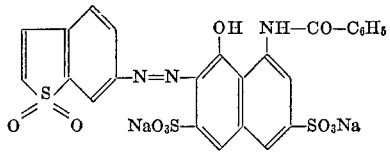

3. Dyestuff according to claim 1, having the structure:

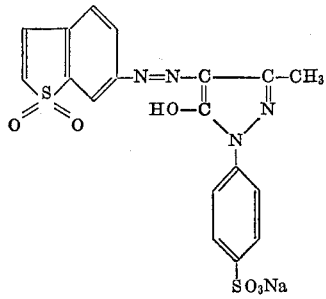

4. Dyestuff according to claim 1, having the structure:

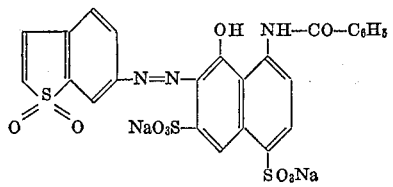

5. Dyestuff according to claim 1, having the structure:

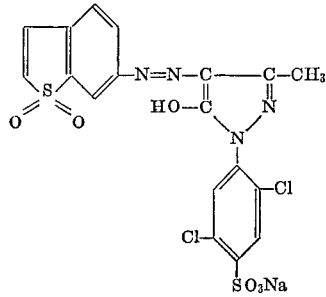

6. Dyestuff according to claim 1, having the structure:

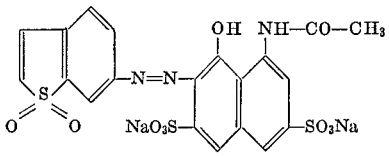

7. Dyestuff according to claim 1, having the structure:

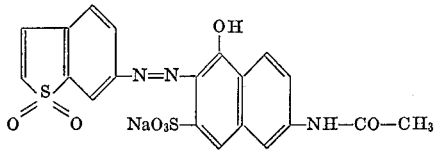

8. Dyestuff according to claim 1, having the structure:

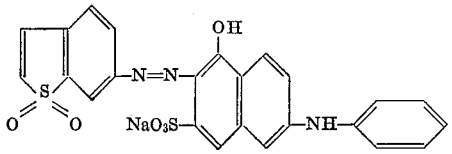

References Cited

UNITED STATES PATENTS

| | | | |
|---|---|---|---|
| 2,186,629 | 1/1940 | Dickey | 260—152 XR |
| 2,752,333 | 6/1956 | Lecher et al. | 260—152 XR |
| 3,177,198 | 4/1965 | Weis et al. | 260—152 |
| 3,234,208 | 2/1966 | Liechti | 260—152 XR |

FLOYD D. HIGEL, Primary Examiner

U.S. Cl. X.R.

8—41; 117—138.8; 260—37, 146, 147, 152, 314.5, 330.5, 329.2